(12) United States Patent
Gorges et al.

(10) Patent No.: US 9,982,715 B2
(45) Date of Patent: May 29, 2018

(54) SLIDING ENGINE COMPONENT

(71) Applicants: Mahle International GmbH, Stuttgart (DE); Mahle Engine Systems UK Ltd (GB)

(72) Inventors: Roger Gorges, Birmingham (GB); John Carey, Northamptonshire (GB); Anil Rathod, Nuneaton (GB)

(73) Assignees: Mahle International GmbH (DE); Mahle Engine Systems UK Ltd. (GB)

( * ) Notice: Subject to any disclaimer, the term of this patent is extended or adjusted under 35 U.S.C. 154(b) by 0 days. days.

(21) Appl. No.: 14/889,849

(22) PCT Filed: May 7, 2014

(86) PCT No.: PCT/EP2014/059364
§ 371 (c)(1),
(2) Date: Nov. 7, 2015

(87) PCT Pub. No.: WO2014/180916
PCT Pub. Date: Nov. 13, 2014

(65) Prior Publication Data
US 2016/0084308 A1    Mar. 24, 2016

(30) Foreign Application Priority Data
May 7, 2013    (GB) .................................. 1308182.3

(51) Int. Cl.
*F16C 33/20*    (2006.01)
*F16C 33/10*    (2006.01)
(Continued)

(52) U.S. Cl.
CPC .............. *F16C 33/201* (2013.01); *F16C 9/02* (2013.01); *F16C 9/04* (2013.01); *F16C 33/102* (2013.01);
(Continued)

(58) Field of Classification Search
CPC ...... F16C 33/20; F16C 33/201; F16C 33/203; F16C 33/205; F16C 33/206
(Continued)

(56) References Cited

U.S. PATENT DOCUMENTS 4,056,478 A * 11/1977 Capelli .................. B01J 13/025
                                                                    384/203
5,827,531 A * 10/1998 Morrison ............. A61K 9/1277
                                                                     264/4.32
(Continued)

FOREIGN PATENT DOCUMENTS

EP         2535104 A1    12/2012
JP        H10114896 A     5/1998
(Continued)

OTHER PUBLICATIONS

English abstract for JP2015155907.
(Continued)

*Primary Examiner* — Ellen M McAvoy
(74) *Attorney, Agent, or Firm* — Fishman Stewart PLLC (57) ABSTRACT

A sliding engine component may include a sliding surface including a plastics polymer-based composite layer disposed on a substrate. The composite layer may include a matrix of plastics polymer-based material. The plastics polymer-based material may have 0.1 to 20 percent by volume of liquid-filled microcapsules distributed throughout the matrix, and incidental impurities.

29 Claims, 4 Drawing Sheets

(51) Int. Cl.
*F16C 9/02* (2006.01)
*F16C 9/04* (2006.01)

(52) U.S. Cl.
CPC ........ *F16C 33/104* (2013.01); *F16C 33/1045* (2013.01); *F16C 33/203* (2013.01); *F16C 33/208* (2013.01); *F16C 2204/12* (2013.01); *F16C 2204/22* (2013.01); *F16C 2208/12* (2013.01); *F16C 2208/58* (2013.01); *F16C 2208/86* (2013.01); *F16C 2208/90* (2013.01); *F16C 2240/48* (2013.01); *F16C 2240/60* (2013.01)

(58) Field of Classification Search
USPC .................................................. 508/100–109
See application file for complete search history.

(56) References Cited

U.S. PATENT DOCUMENTS

| | | | | |
|---|---|---|---|---|
| 6,099,864 | A * | 8/2000 | Morrison | A61K 9/1277 264/4.1 |
| 6,482,873 | B1 * | 11/2002 | Beckmann | C08K 9/10 523/149 |
| 7,887,922 | B2 * | 2/2011 | Mayston | F16C 33/201 428/457 |
| 9,708,692 | B2 * | 7/2017 | Zidar | C22C 5/06 |
| 2003/0134141 | A1 * | 7/2003 | Okado | F16C 5/00 428/626 |
| 2007/0134411 | A1 * | 6/2007 | Cont | B01J 13/02 427/213.34 |
| 2007/0297704 | A1 | 12/2007 | Mayston et al. | |
| 2009/0326087 | A1 | 12/2009 | De Jong et al. | |
| 2010/0279098 | A1 | 11/2010 | Fischer et al. | |
| 2011/0034354 | A1 * | 2/2011 | Zidar | C22C 5/06 508/103 |
| 2011/0177141 | A1 * | 7/2011 | Celeste | A47G 19/2205 424/401 |
| 2011/0249920 | A1 * | 10/2011 | Kobayashi | C01B 31/02 384/13 |
| 2011/0317955 | A1 * | 12/2011 | Mayston | C08L 79/08 384/625 |
| 2012/0077017 | A1 * | 3/2012 | Buresch | B22F 3/115 428/312.8 |
| 2012/0251020 | A1 * | 10/2012 | Swei | F16C 33/201 384/13 |
| 2012/0253000 | A1 * | 10/2012 | Okawa | B01J 13/16 526/340.3 |
| 2013/0146009 | A1 * | 6/2013 | Pederson | C10M 169/04 123/1 A |
| 2014/0050844 | A1 * | 2/2014 | Hsu | F16C 33/201 427/140 |
| 2014/0087982 | A1 * | 3/2014 | Calcavecchio | B01J 13/14 508/170 |
| 2014/0100144 | A1 * | 4/2014 | Ziegler | F16C 33/201 508/104 |
| 2014/0226927 | A1 * | 8/2014 | Ishii | F16C 13/02 384/291 |
| 2015/0125101 | A1 * | 5/2015 | Kachoosangi | F16C 33/201 508/106 |
| 2015/0369288 | A1 * | 12/2015 | Cieslik | C08K 7/24 508/106 |
| 2017/0073610 | A1 * | 3/2017 | Hsu | B01J 13/14 |

FOREIGN PATENT DOCUMENTS

| | | |
|---|---|---|
| JP | 2005-155907 A | 6/2005 |
| JP | 2007517165 A | 6/2007 |
| JP | 2010009043 A | 1/2010 |
| JP | 2010525093 A | 7/2010 |
| JP | 2012511128 A | 5/2012 |
| JP | 2012122135 A | 6/2012 |
| JP | 2012518703 A | 8/2012 |
| JP | 2012246863 A | 12/2012 |
| WO | WO-2005042953 A2 | 5/2005 |
| WO | WO-2010/066396 A1 | 6/2010 |
| WO | 2010096168 A1 | 8/2010 |
| WO | WO-2011/000068 A1 | 1/2011 |
| WO | WO-2012115953 A1 | 8/2012 |
| WO | WO-2013058660 A1 | 4/2013 |

OTHER PUBLICATIONS

English abstract for EP2535104.
Chinese Office Action dated Mar. 27, 2017 corresponding to related Chinese Application No. 201480024312.4.
Japanese Office Action dated Oct. 31, 2017 related to corresponding Japanese Patent Application No. 2016-512368.

* cited by examiner

SLIDING ENGINE COMPONENT

CROSS-REFERENCE TO RELATED APPLICATIONS

This application claims priority to British Patent Application No. 1308182.3, filed May 7, 2013, and International Patent Application No. PCT/EP2014/059364, filed May 7, 2014, both of which are hereby incorporated by reference in their entirety.

TECHNICAL FIELD

The present invention relates to sliding engine components having a polymer-based bearing material layer, and in particular to sliding engine components for sliding bearing assemblies such as bearing lining shells, bushes, bearing surfaces of crankshafts, bearing surfaces of camshafts, bearing surfaces of connecting rods, thrust washers, bearing surfaces of a bearing block, bearing surfaces of a bearing cap, and piston assembly components such as piston rings, piston skirts, and cylinder walls and cylinder liners.

BACKGROUND

In internal combustion engines, the bearing assemblies typically each comprise a pair of half bearings retaining a crankshaft that is rotatable about an axis. Each half bearing comprises a hollow generally semi-cylindrical bearing shell, and typically at least one is a flange half bearing, in which the bearing shell is provided with a generally semi-annular thrust washer extending outwardly (radially) at each axial end. In some half bearings, a single-piece construction of the bearing shell and thrust washers is used, whilst in other half bearings, the bearing shell and the thrust washer are loosely mechanically engaged with clip-like features, and in a further type of half bearing the thrust washers are permanently assembled onto the bearing shell by deformation of engagement features. In other bearing assemblies it is also known to use annular or circular thrust washer.

The bearing surfaces of sliding bearings generally have a layered construction. The layered construction frequently comprises a strong backing material, such as steel, of a thickness in the region of about 1 mm or more; a layer of a first bearing material (the "lining layer"), such as a copper-based material (e.g. copper-tin bronze) or aluminium-based material, is adhered to the backing, and of a thickness generally in the range from about 0.1 to 0.5 mm (e.g. 300 µm of copper-based alloy of 8% wt Sn, 1% wt Ni, and balance of Cu, apart from incidentally impurities); and a layer of a second bearing material (the "overlay layer") of a metallic or polymer-based bearing material adhered to the surface of the lining layer and having a thickness of less than about 25 µm.

The surface of the second layer forms the actual running or sliding surface, which, in use, faces the surface of a co-operating member, e.g. crankshaft journal. In the case of a bearing shell, the backing provides strength and resistance to deformation of the bearing shell when it is assembled in a main bearing housing or in a connecting rod big end, for example. The first layer may provide suitable bearing running properties, if the second layer should become worn through. Whilst the first bearing material provides seizure resistance and compatibility, it is generally harder than the material of the second layer. Thus, the first layer is commonly inferior to the second layer in terms of its ability to accommodate small misalignments between the bearing surface and the shaft journal (conformability) and in the ability to embed dirt particles circulating in the lubricating oil supply, so as to prevent scoring or damage to the journal surface by the debris.

The first bearing material is commonly chosen from either an aluminium-based alloy (i.e. having no more than 25% wt additive elements, with the balance to 100% wt of aluminium, apart from incidental impurities) or a copper-based alloy material (i.e. having no more than 20% wt additive elements, with the balance to 100% wt of copper, apart from incidental impurities). Aluminium-based alloys generally comprise an aluminium alloy matrix having a second phase of a soft metal therein. Generally, the soft metal phase may be chosen from one or more of lead, tin and bismuth, however, lead is nowadays a non-preferred element due to its environmental disadvantages. Copper-based alloys such as copper-lead and leaded bronzes are also likely to fall into disfavour eventually due to these environmental considerations and may be replaced by lead-free copper alloys, for example.

The second bearing material layer, which forms a mating fit with the shaft journal with a clearance for lubricating fluid, is also known as an overlay layer and is formed of a matrix of plastics polymer material, typically comprising solid filler particulate, and for example has a thickness of 4 to 40 µm.

WO2010066396 describes a related plastics polymer-based composite bearing layer comprising a matrix of a polyimide/amide plastics polymer material, and having distributed throughout the matrix: from 5 to less than 15% vol of a metal powder; from 1 to 15% vol of a fluoropolymer particulate, the balance being the polyimide/amide resin apart from incidental impurities (e.g. a layer of 12 µm thickness that comprises 12.5% vol Al, 5.7% vol PTFE particulate, 4.8% vol silane, <0.1% vol other components, and balance (approximately 77% vol) polyimide/amide). Although the compositions of the plastics polymer-based bearing layer of WO2010066396 provides high wear resistance and fatigue strength, it remains desirable to further increase the seizure resistance of such polymer-based layers in sliding bearings, particularly in the overlay layers of such sliding bearings.

Fuel-saving operating schemes have become popular for automotive engines, which increase the frequency with which the engine is started. Under a "stop-start" operating scheme, stopping and restarting vehicle movement also leads to the engine being stopped and restarted. Under a "hybrid" operating scheme, the engine is turned off when the vehicle can be powered by an alternative power source, commonly being electrically powered. The greater frequency with which the engine is started under such operating schemes places an increased demand upon the performance of the thrust washers and bearing shells by increasing the frequency with which the counterface of the associated web and journals of the crankshaft respectively contact the thrust washers and bearing shells, and cause correspondingly increased wear of the running surfaces.

In piston assemblies, it is known to reduce the likelihood of scuffing between the piston skirt 10 and cylinder wall, it is well known to provide lubrication between the pistons and cylinder walls from the lubrication oil in the crankcase. In addition, it is known to provide engine components with wear resistant coatings. For example, it is known to coat piston cylinder liners with Nikasil®, which is a electrodeposited lipophilic nickel matrix silicon carbide coating. Similarly, it is known to coat the piston skirt with a material to assist in lubrication and to avoid metal-to-metal contact between the two components, thereby reducing wear, improving lubrication, and/or thermal properties within the cylinder, as described in WO2005042953.

Four-stroke engines commonly use three piston rings on each piston, being two compression rings and one oil ring. The role of the compression rings is to prevent the passage of the combustion gases into the crankcase, whereas the function of the oil ring is to scrape the excess oil from the cylinder wall and return it to the crankcase, controlling the thickness of the 'film' of oil and preventing it from being unduly burned. Another important function of the rings is to act as a bridge to transmit heat from the piston to the cylinder wall or cylinder liner (also known as a cylinder sleeve), where it is dissipated by way of the cooling system. On the piston rings, in particular on the compression rings, it is known to apply a coating layer on at least the outer circumference that comes into contact with the cylinder wall, as is described in WO2011000068.

SUMMARY

According to a first aspect of the present invention there is provided a sliding engine component having a sliding surface provided by a plastics polymer-based composite layer on a substrate, the composite layer comprising:
 a matrix of plastics polymer-based material having distributed throughout the matrix:
 0.1 to 20% vol liquid-filled microcapsules; and
 incidental impurities.

According to a second aspect of the present invention there is provided a flat sheet element for forming a sliding engine component having a sliding surface provided by a plastics polymer-based composite layer on a substrate, the composite layer comprising:
 a matrix of plastics polymer-based material having distributed throughout the matrix:
 1 to 20% vol liquid-filled microcapsules; and
 incidental impurities.

According to a third aspect of the present invention there is provided a method of manufacturing a sliding engine component having a sliding surface provided by a plastics polymer-based composite layer on a substrate, the composite layer comprising:
 a matrix of plastics polymer-based material having distributed throughout the matrix:
 0.1 to 20% vol liquid-filled microcapsules; and
 incidental impurities,
the method comprising the steps of:
 making a mixture comprising a plastics polymer-based resin material and liquid-filled microcapsules;
 coating the mixture onto a substrate; and,
 treating so as to consolidate the plastics polymer-based material matrix to form a composite layer.

Advantageously, the use of microcapsules provides a localised release of liquid lubrication when required (i.e. "on demand"), reducing the risk of seizure between components (i.e. tribological partners) that are moving relative to each other at high speed. It is particularly advantageous that the emergency lubrication is localised, being provided at the point of contact between the sliding engine component and the cooperating member.

The upper limit of 20% vol liquid-filled microcapsules relates to the structural integrity of the composite layer, since above this level the microcapsules may cause a significant reduction in fatigue resistance of the composite layer. The beneficial property or properties of the liquid released from the microcapsules (e.g. seizure resistance, corrosion resistance or cracking resistance) reduces at low levels, and below 0.1% vol liquid-filled microcapsules a significant benefit may not be provided.

The composite layer may comprise 0.5 to 5% vol liquid-filled microcapsules. This range provides a particularly advantageous compromise between obtaining the benefits from incorporating the liquid-filled microcapsules, whilst minimizing any reduction in fatigue resistance.

The microcapsules may have a mean average diameter of no more than half the thickness of the composite layer. The microcapsules may have a mean average diameter of no more than a quarter the thickness of the composite layer. The microcapsules may be generally spherical.

The liquid-filled microcapsules may have a mean average diameter of 0.5 to 10 µm. The mean average diameter of the microcapsules is less than the thickness of the composite layer (or sub-layer).

The composite layer may have a thickness of 6 to 40 µm, and preferably 6 to 20 µm.

Advantageously, the provision of microcapsules that are significantly smaller than the thickness of the composite layer enables microcapsules to become exposed, and for the liquid contents to be released, as the surface of the sliding engine component is progressively worn away.

The composite layer may comprise a plurality of different sub-layers. The plurality of layers may comprise two different sub-layers. Advantageously, sub-layers may be selected to provide different performance properties as the composite layer wears.

The sub-layers may comprise different % vol concentrations of microcapsules.

The sub-layers may comprise different % vol concentrations of metal particulate.

The sub-layers may comprise different liquid-filled microcapsules (e.g. filled with liquids having different compositions).

A sub-layer closer to the substrate may comprise a lower proportion of lubricant liquid than a sub-layer further from the substrate. The sub-layer closer to the substrate may comprise fewer microcapsules of lubricant, and a higher proportion of a particulate, e.g. metal powder to improve wear resistance.

The liquid within the microcapsules may comprise a liquid lubricant (e.g. mineral oil, synthetic polyalphaolefin (POA) oil). The liquid may comprise oil having a viscosity of $\geq 5.6$ mm$^2$/s (i.e. $\geq 5.6$ cSt) at 100° C., e.g. oils falling within Society of Automotive Engineers class SAE20 and above. Advantageously the oil within the microcapsules has a higher viscosity than the engine lubrication oil in the crankcase of the engine, to provide enhanced lubrication in the case of wear of the composite layer. Higher viscosity oils can provide improved lubrication to the composite layer.

The liquid may comprise a liquid lubricant and a liquid additive. The liquid may comprise a dissolved solid additive (e.g. amines, which are solid salts) that is configured to react with a surface of the tribological partners, e.g. to harden or lubricate the surface.

The liquid additive may comprise a corrosion inhibitor. Some engine lubrication oils (e.g. organically derived "biooils") comprise oxidising species, which can cause corrosion of the metallic components, such as the substrate on which the composite layer is deposited. In the event that the composite layer should become cracked, or worn through, corrosion could spread into the metallic substrate reducing bearing performance. Further, such corrosion could spread along the surface of the substrate beneath the composite layer, causing delamination of the composite layer, also reducing bearing performance. Advantageously, the corrosion inhibitor can work close to where it is released from the microcapsule, to prevent such corrosion and effects.

The liquid additive may comprise a self-healing additive, e.g. an adhesive or a monomer for the polymer of the matrix. Advantageously, a self-healing additive can fill cracks arising in the composite layer to maintain the structural integrity of the composite layer. For example, a liquid monomer released from microcapsules that are fractured by a crack can flow into the crack and seal the crack, to inhibit detrimental ingress of harmful liquids, e.g. water, degraded oil products, ethanol from fuel, or corrosive lubricant from the bearing clearance from flowing into contact with the substrate of the bearing shell.

The shell of the liquid-filled microcapsule may comprise a polymeric material (e.g. polyester, polyuria, polyurethane, cellulose, polyethylene, polypropylene, polystyrene). Advantageously, polymeric materials are compatible with the plastics polymer-based matrix material and suitable solvent systems for the matrix (i.e. the shell does not dissolve in the solvent).

The shell of the liquid-filled microcapsule may comprise a functionalised exterior surface, or be provided with a coating, which promotes suspension of the microcapsules within the solution of the composite layer prior to deposition of the composite layer onto the substrate.

The surface functionalisation may be the provision of an anionic or cationic surface charge, e.g. providing all microcapsules with a common surface charge causes mutual repulsion, reducing agglomeration, and providing a more evenly distributed suspension. The surface functionalisation may be the provision of a hydrophilic or hydrophobic surface. The coating may be provided by an electroless plating method, in which exterior surface of the capsules is metalized.

The plastics polymer matrix material may be selected from the group consisting of a polyimide/amide resin, acrylate resin, epoxy resin, polyurethane, fluoropolymer, polyetherehterketone, and phenolic resin.

Desirably the solvent mixture is of a suitable viscosity that the coating technique of applying the solvent mixture to the substrate results in the final thickness of the plastics polymer composite layer being formed, without the need to machine to a desired final, wall thickness. However, machining of the plastic polymer material may be undertaken, if required.

The composite layer may comprise at least 60% vol of plastics polymer-based material.

The mixture of plastics polymer-based resin material and liquid-filled microcapsules may further comprise solvent, which may facilitate forming the mixture. Suitable solvents may be non-polar (e.g. xylene, toluene), polar aprotic (e.g. acetone, n-ethyl-2-pyrrolidone {NEP}, n-methyl-2-pyrrolidone {NMP}) or polar protic (e.g. water, alcohol, glycol). The solvent can be employed in various proportions in order to achieve a particular desired viscosity of mixture for coating onto the substrate.

The plastics polymer mixture may also contain an addition of a silane material. Silane materials have been found to promote stability of the polyimide/amide matrix and have also been found to promote adhesion of the polyimide/amide resin material to the substrate. A suitable silane material may be a gamma-aminopropyltriethoxysilane (e.g. 3-aminopropyltriethoxysilane), and an addition in the range of 3 to 6% vol may be made to the mixture. A suitable alternative silane material may comprise bis-(gamma-trimethoxysilpropyl) amine.

The composite layer may further comprise from 0.5 to 15% vol of a dry lubricant particulate, and a preferred range of 2 to 8% vol.

A dry lubricant particulate may be included in the composite layer for its beneficial effect on material frictional properties and its self-lubricating effect. The dry lubricant particulate may be fluoropolymer, $Mo_2S$, or graphene. The fluoropolymer particulate addition may preferably be constituted by polytetrafluoroethylene (PTFE), as this is the most effective of the fluoropolymers in terms of reducing the friction coefficient of the composite layer and improving the self-lubricating properties. However, other suitable fluoropolymers, such as fluorinated ethylene-propylene (FEP), may be used if desired.

Below 0.5% vol of the dry lubricant particulate, the improvement in wear resistance and tribological properties is not significant. Above 15% vol of the dry lubricant particulate, the structural integrity of the composite layer may be compromised. Too high a content of dry lubricant particulate reduces the matrix hardness and strength by an unacceptable degree.

Particle size of the dry lubricant particulate desirably lies in the range from 1 to 5 µm, and a size range of 2 to 3 µm is preferred.

The composite layer may further comprise from 0.5 to less than 15% vol of a metal powder. Advantageously, the metal powder (particularly in the form of metallic flakes) enhances the thermal conductivity of the composite layer. The metal powder may further enhance the wear resistance of the composite layer. Below 0.5% vol of the metal powder, the improvement in wear resistance and tribological properties is not significant. Above 15% vol of the metal powder, the structural integrity of the composite layer may be compromised. In a preferred embodiment of the plastics polymer composite layer of the present invention, the metal powder content may lie in the range from 2 to 25% vol, and more preferably from 5 to 15% vol.

The metal powder may be chosen from: aluminium, aluminium alloys, copper, copper alloys, silver, tungsten, stainless steel. We have found that pure aluminium powder on its own gives the best results.

Aluminium powder having particles in the form of flake platelets of about 1 to 5 µm in size, and preferably 2 to 3 µm in size, provides a suitable form of metal powder addition. The flake nature of the powder generally results in the maximum area of metal powder being exposed to a co-operating shaft journal by virtue of the plane of the flakes orientating generally parallel to the bearing surface. The provision of flakes within the composite layer that are generally parallel to the bearing surface may be provided by spray deposition of the composite layer.

A further advantage of the platelet flake morphology of the aluminium powder is that the particles are more securely bonded to the matrix by virtue of the relatively large surface area of each individual particle, and thus resists aluminium particles becoming plucked from the matrix during engine operation.

Without wishing to be bound by any particular theory, it is believed that the alumina film formed on the surface of the aluminium flakes may provide enhanced wear resistance. It is believed that the alumina in the composite layer of the sliding engine component provides a very fine abrasive, which tends to polish the machining asperities on the surface of the cooperating member (e.g. shaft journal surface), rendering the shaft journal surface less abrasive to the polymer-based composite layer and thus reducing the wear rate thereof.

The composite layer may comprise a matrix of a polyimide/amide plastics polymer material 15 and having distributed throughout the matrix: from 0.5 to less than 15% vol of a metal powder; from 0.5 to 15% vol of a fluoropolymer particulate, the balance being the polyimide/amide resin apart from incidental impurities.

The composite layer may comprise 12.5% vol Al powder, 5.7% vol PTFE particulate, 4.8% vol silane powder, <0.1% vol other components, and balance polyimide/amide.

The composite layer may comprise from 0.5 to 10% vol inorganic particulate, and a preferred range of 3 to 5% vol. Advantageously, the inorganic particulate may increase the wear resistance of the composite layer.

The inorganic particulate may be a hard inorganic particulate. The hard inorganic particulate may be selected from the group consisting of TiCN, SiC, NbC, $Si_3N_4$, $Al_2O_3$ (alumina), $Fe_2O_3$, $TiO_2$, $BaSO_4$, TiN, $B_4C$, WC and BN. The hard inorganic particulate may comprise nanoclay (i.e. nanoparticles of layered mineral silicates, e.g. montmorillonite mineral deposits known to have platelet-like structures with average dimensions of 1 nm thickness and 70 to 150 nm width). Advantageously, the nanoclay may act as a thixotropic agent that makes the solution for the composite layer more viscous as it is deposited onto the underlying substrate, which may facilitate the deposition of a thicker layer of solution, to form a thicker composite layer. The inorganic particulate may be talc (hydrated magnesium silicate).

Alumina appears to have a beneficial effect in that it gently polishes the surface of cooperating steel member (e.g. a steel shaft journal) to render the surface less abrasive to the surface of the sliding engine component (e.g. bearing shell) thereby decreasing wear of the engine component.

Boron nitride may be beneficial, particularly where the particle morphology is in platelet form.

Boron nitride of hexagonal crystal structure in platelet form may co-operate with the lubricant to provide enhanced compatibility resulting in better seizure and scuffing resistance, in concert with the seizure resistance provided by the liquid-filled microcapsules.

Talc, whilst being a very soft material, in contrast to boron nitride, for example, appears to reinforce the polymer matrix, especially at the edges of a bearing shell, adjacent the axial bearing ends where some shrinkage may otherwise occur during curing of the polymer, resulting in greater edge wear in use when talc is not present. However, it has also been found that boron nitride also fulfills this function of minimising shrinkage and wear effects at bearing edges.

The composite layer may further comprise 0.1 to 5% vol carbon nanostructures (i.e. carbon structures having at least one dimension that is sub-micron, and preferably less than 100 nm, in size), e.g. carbon nanotubes. Advantageously, the incorporation of carbon nanostructures into the polymer-based matrix increases the strength, hardness and wear resistance of the composite layer, whilst still permitting good embedability of any particulate carried in the oil that lubricates the bearing.

The substrate may comprise a strong backing material layer and the composite layer may be provided on the backing material layer. The strong backing material may be steel, copper-based (e.g. bronze-based alloy) or aluminium-based.

The substrate (particularly in the case of a sliding bearing) may comprise a strong backing material layer and a metallic lining layer and the composite layer may be provided on the metallic lining layer. The metallic lining layer may be an aluminium-based or copper-based bearing alloy.

In the case where only a strong backing layer is used without an intervening metallic lining layer, the composite layer may be deposited in a thicker layer than in the case where it is deposited upon a metallic lining layer.

The lining layer may comprise a lead-free Cu-based alloy (a Cu-based alloy having no more than 20% wt additive elements, with the balance to 100% wt of Cu; e.g. 8% wt Sn, 1% wt Ni, and Cu remaining balance), and has a thickness in the region of 300 μm (e.g. 200 to 400 μm).

Alternatively, the lining layer may comprise a lead-free Al-based alloy (an Al-based alloy having no more than 25% wt additive elements, with the balance to 100% wt of Al, e.g. 6.5% wt Sn, 1% wt Cu, 1% wt Ni, 2.5% wt Si, <2% wt Mn, <2% wt V, and Al remaining balance), and has a thickness in the region of 300 μm (e.g. 200 to 400 μm).

The lining layer may be provided onto the backing by a known method, e.g.: (i) sintering a powder onto the backing in a high temperature furnace (commonly accompanied by a mechanical rolling step); (ii) by a roll-bonding process (typically followed by a heat treatment step) during a thermo-mechanical working process; or (iii) by a casting process in which molten metal is spread onto the backing and quenched. The sintering and casting processes are typically used with Cu-based lining layers and the roll-bonding process is typically used with Al-based lining layers. Typically, the blanks for individual bearings are cropped from a coil comprising the backing layer with the Cu- or Al-based lining layer formed thereon. The blanks are then shaped to form half-cylinders or other appropriate shapes, and then typically de-greased before deposition of any interlayer and the polymer-based overlay coating. However, it will be appreciated that the manufacturing steps may be undertaken in other appropriate orders.

The sliding engine component may be a sliding bearing assembly component. The sliding bearing assembly component may be selected from the group consisting of bearing lining shells (e.g. semi-cylindrical half bearing shells), bushes (e.g. tubular bushing), bearing surfaces of crankshafts, bearing surfaces of camshafts, bearing surfaces of connecting rods, thrust washers (e.g. substantially semi-annular thrust washer), bearing surfaces of a bearing block (e.g. ladder frame configured to receive a journaled shaft without an intervening bearing shell or tubular bushing), and a bearing surface of a bearing cap.

The sliding engine component bearing may be a piston assembly component. The piston assembly component may be selected from the group consisting of piston rings, piston skirts, cylinder walls and cylinder liners.

Adhesion of the composite layer onto the lining layer may be enhanced by grit-blasting the lining layer prior to deposition of the composite layer. Alternatively, an adhesion enhancing interlayer may be provided, e.g. the substrate may comprise a non-sputter coated metallic base layer (e.g. the strong backing layer or metallic lining layer) and the composite layer may be bonded to the non-sputter coated metallic base layer by a sputter-coated Al-based intermediate layer. The sputter-coated Al-based intermediate layer may have a thickness of less than 20 μm.

The composite layer may have a thickness of less than 100 μm, and preferably from 4 to 40 μm, more preferred from 4 to 15 μm, and yet more preferred from 6 to 12 μm. Thinner composite layers may be worn through before the end of engine life, and thicker composite layers may have a lower fatigue resistance.

In the described compositions, the proportions (i.e. % vol and % wt) of polymer, microcapsules, and any other components of the composite layer are those remaining in the final material after the solvent has been substantially removed.

The method of coating may be selected from the group consisting of spraying, printing (e.g. screen printing or pad printing), and transfer rolling.

The mixture of plastics polymer-based resin material and liquid-filled microcapsules may further comprise solvent, and the method may comprise the step of treating the sliding engine component to remove the solvent after the mixture has been coated onto the substrate.

In the case of spraying, control of layer thickness may also be exercised by spraying a plurality of separate layers onto the substrate.

The flat sheet element for forming a sliding engine component may be a flat strip or a flat sheet from which such a sliding engine component may be formed by a pressing and/or stamping operation, after the coating step.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals.

Figure 1A:
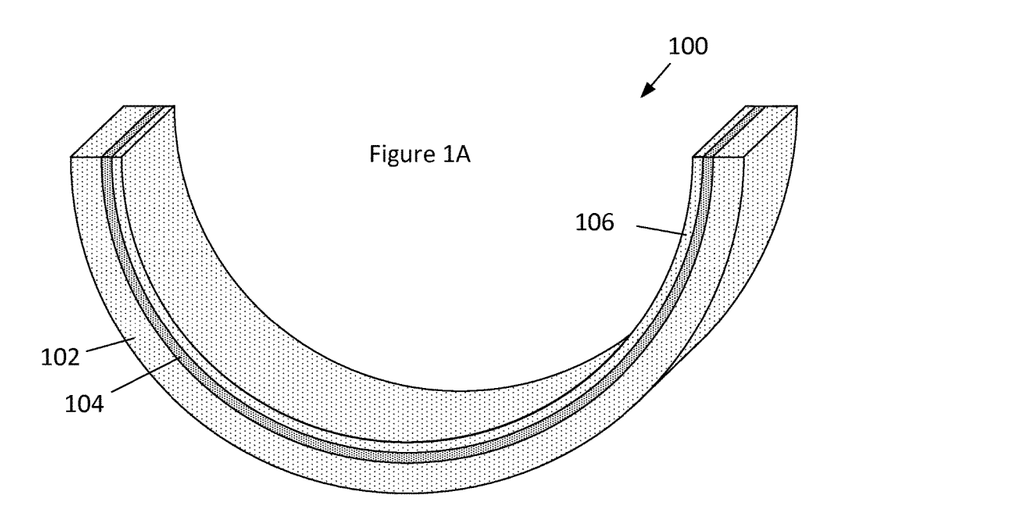
FIG. 1A shows a schematic perspective view of a semi-cylindrical bearing shell.
Figure 1B:
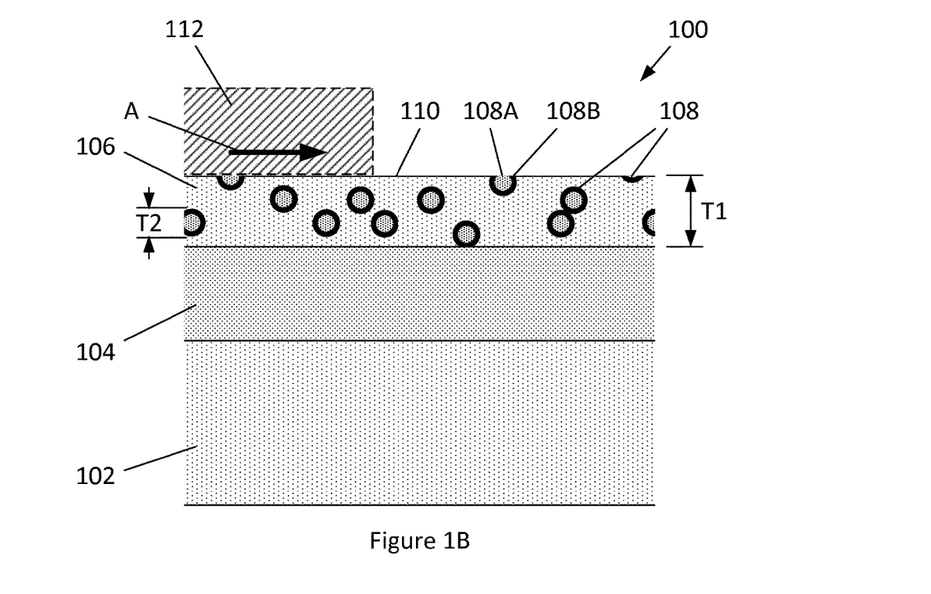
FIG. 1B shows a schematic cross-sectional view through part of a bearing shell of FIG. 1A.

FIG. 1A schematically illustrates a sliding bearing 100 (e.g. a sliding engine component) in the form of a hollow semi-cylindrical bearing lining shell (commonly referred to as a "half bearing"). FIG. 1B shows a cross-sectional view through the sliding bearing 100 of FIG. 1A.

The half bearing 100 comprises: a substrate comprising a strong steel backing 102, a copper-based bearing lining layer 104 on the concave inner surface of the backing; and, a plastics polymer-based composite "overlay" layer 106 comprising liquid filled microcapsules 108 that is provided directly onto the lining layer (i.e. the substrate).

The adhesion of the composite overlay layer 106 may be enhanced by the application of a surface preparation technique to the surface of the bearing lining layer 104, such as grit-blasting, prior to deposition of the composite overlay layer. Alternatively, an additional aluminium-based sputtered layer (not shown) may be provided directly onto the lining layer 104, before the composite overlay layer 106.

The overlay layer 106 is configured to provide a running surface over the lifetime of the sliding bearing 100 (e.g. over engine-life), in contrast to a less robust running-in layer for short-term use, for running-in at the start of life. The overlay layer 106 is the innermost layer of the half bearing, which is configured to face a moving element in a bearing assembly (e.g. the overlay layer receives a journaled shaft in an assembled bearing, which mutually cooperate, with an intervening oil film).

The composite overlay layer 106 comprises a matrix of plastics polymer-based composite material having liquid-filled microcapsules distributed throughout the matrix. The composite layer comprises 2% vol liquid-filled microcapsules, 12.5% vol Al powder, 5.7% vol PTFE particulate, 4.8% vol silane powder, <0.1% vol other components, and balance polyimide/amide plastics polymer, apart from incidental impurities.

The polyimide/amide based material is applied as a mixture with a solvent. A suitable solvent may comprise n-methyl-2-pyrrolidone xylene and can be employed in various proportions in order to achieve a particular desired viscosity of mixture suitable for coating onto the substrate. Note that in the specification, above, of the composition of the plastics polymer-based composite overlay layer 106 is that which remains after the overlay layer has been fully cured (e.g. the solvent has been substantially removed).

A mixture is formed with the polyimide/amide in the solvent, the microcapsules and other components. The mixture may be agitated to maintain the components in suspension, prior to coating the bearing substrate. The composite overlay layer 106 is built up by a spray coating process in which repeated deposition of thin spray coatings is interspersed with flash off phases to remove solvent. After the final coating deposition step, the sliding bearing is given a final cure at 150 to 250° C. for about 30 minutes, to consolidate the plastic polymer-based matrix.

Alternatively, the plastics polymer-based composite layer 106 could be deposited by a screen printing (i.e. through a mask), a pad printing process (i.e. an indirect offset printing process, e.g. in which a silicone pad transfers a patterned layer of the plastics polymer composite material onto the sliding bearing substrate), or by a transfer rolling process.

Desirably the solvent mixture is of a suitable viscosity that the coating technique of applying the solvent mixture to the substrate results in the final thickness of the plastics polymer-based composite layer being at a desired thickness without the need to machine to a desired final wall, thickness. However, machining of the plastic polymer-based composite layer may be undertaken if required.

In the alternative case that an interlayer is additionally provided, the interlayer is deposited by a sputter coating process, has a thickness of 2 to 3 μm, and is strongly adhered to the bearing lining layer 104. The interlayer may comprise 1.5% wt Mn with the remaining balance to 100% wt of Al, apart from incidental impurities. (In alternatives: the interlayer may comprise 6% wt Sn, 1% Cu, 1% wt Ni, and 2% wt Si, with the balance to 100% wt being Al apart from incidental impurities; or the interlayer may comprise pure Al, apart from incidental impurities.)

The microcapsules 108 comprise a shell 108A filled with liquid 108B. The liquid 108B within the shell 108B is preferably a liquid lubricant and may comprise other oil additives. The shell comprises a polymeric material (e.g. polyester, polyuria, polyurethane, cellulose, polyethylene, polypropylene, polystyrene), having a coating or functionalised surface that promotes suspension of the microcapsules within the solution of the composite layer before it is deposited onto the substrate. The microcapsules 108 are embedded throughout the composite layer 106, and at the surface 110 of the composite layer, the microcapsules are exposed. The composite layer 106 has a thickness T1 and the embedded liquid-filled microcapsules 108 have a diameter T2, which is no more than half the thickness of the composite layer.

FIG. 18 schematically illustrates a separate cooperating component 112 (i.e. a tribological partner, e.g. part of a crankshaft) that is moving in the direction of the arrow A relative to the sliding bearing. FIG. 1B illustrates the situation in which component 112 contacts the surface 110 of the sliding bearing. During contact, the component 112 abrasively wears the surface 110 of the sliding bearing 100, exposing microcapsules 108, which are broken open, leading to the release of further liquid lubricant 1088 out of the shells 108A. The released liquid 108B provides localised, emergency lubrication between the component 112 and the surface 110 where they are in contact, reducing the risk of seizure (i.e. localised micro-welding) occurring between the component and the sliding bearing 100.

Figure 1C:
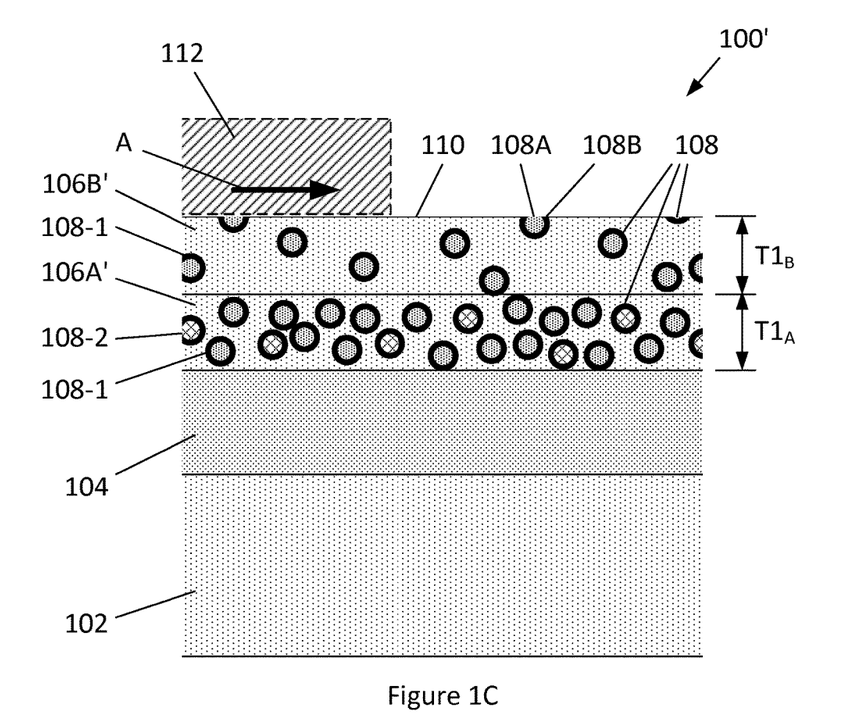
FIG. 1C shows a schematic cross-sectional view through part of a bearing shell comprising two different composite sub-layers.

FIG. 1C schematically illustrates a cross-sectional view through the sliding bearing 100', that differs from the sliding bearing 100 of FIGS. 1A and 1B by the composite layer comprising two different sub-layers 106A' and 106B'. The lower sub-layer 106A', adjacent the substrate (i.e. adjacent the bearing lining layer 104), has a higher concentration of microcapsules 108 than the upper sub-layer 106B'. The upper sub-layer 106B and the lower sub-layer 106A' both comprises a microcapsules 108-1 of a first type (e.g. filled with a liquid lubricant), and the lower sub-layer 106A' additionally comprises microcapsules 108-2 of a second type (e.g. filled with lubricant and a self-healing additive). If the upper sub-layer 106B' should become worn through, the lower sub-layer 106A' would become exposed, and the higher concentration of microcapsules may provide an enhanced level of lubrication and seizure resistance. Further, if a crack should penetrate into the lower sub-layer 106A', self-healing additive may be released to seal the crack, to prevent corrosive lubricating oil in the bearing clearance from penetrating through the crack to the bearing lining layer 104 of the substrate.

Figure 1D:
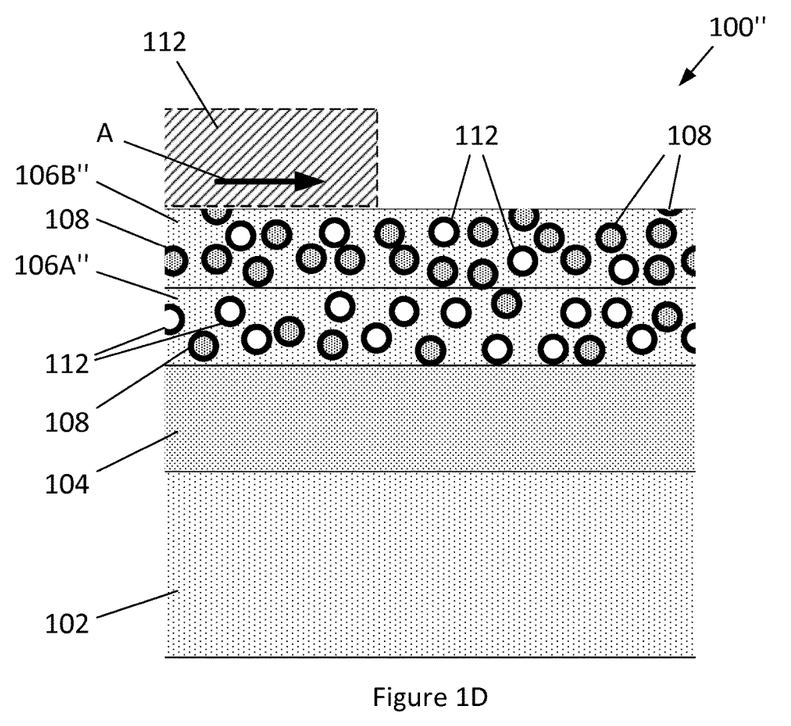
FIG. 1D shows a schematic cross-sectional view through part of a bearing shell comprising a further two different composite sub-layers.

FIG. 1D schematically illustrates a cross-sectional view through the sliding bearing 100", that differs from the sliding bearing 100 of FIGS. 1A and 1B by the composite layer comprising two different sub-layers 106A" and 106B. Both sub-layers 106A" and 106B" contain both microcapsules 108 and metal particulate 112 (e.g. aluminium flakes). The lower sub-layer 106A" has a lower concentration of microcapsules 108 than the upper sub-layer 106B". The lower sub-layer 106A" has a higher concentration of metal particulate 112 than the upper sub-layer 106B". If the upper sub-layer 106B" should become worn through, the lower sub-layer 106A" would become exposed, and the higher concentration of metal particulate may provide an enhanced level of wear resistance.

Although the illustrated sliding bearing is a semi-cylindrical bearing shell, the present invention may also be applied to other sliding bearings, including thrust washers, tubular bushing, a bearing surface of a connecting rod, a shaft configured for journaling in a bearing, a bearing block, and a bearing cap.

Although illustrated in the case of a pre-formed bearing shell, it will be appreciated that the present invention also applies to blanks from which sliding bearings may be formed, e.g. flat strip or sheet materials from which such sliding bearings may then be formed after the coating step.

Figure 2A:
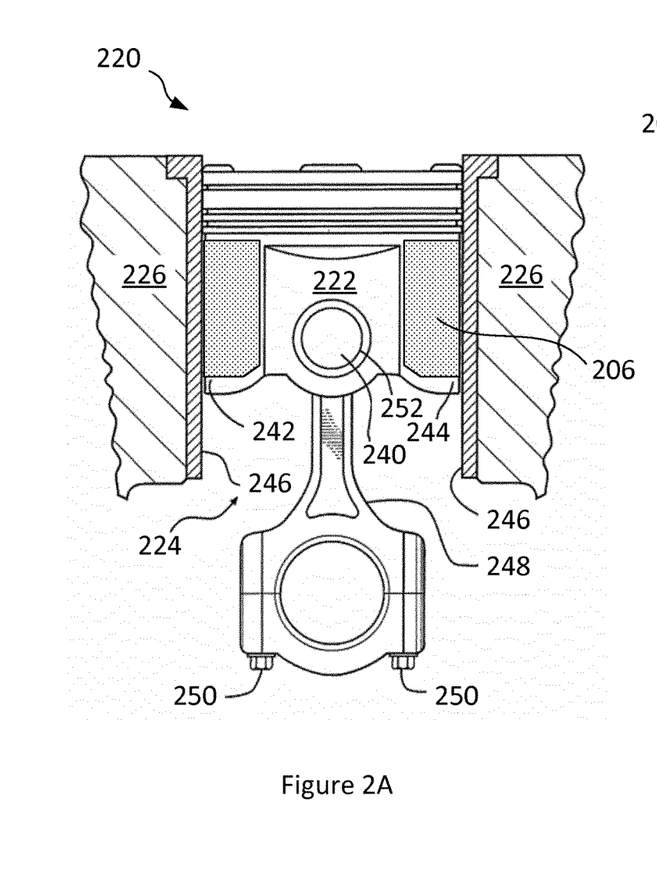
FIG. 2A shows a cut-away view of a piston within a piston cylinder.
Figure 2B:
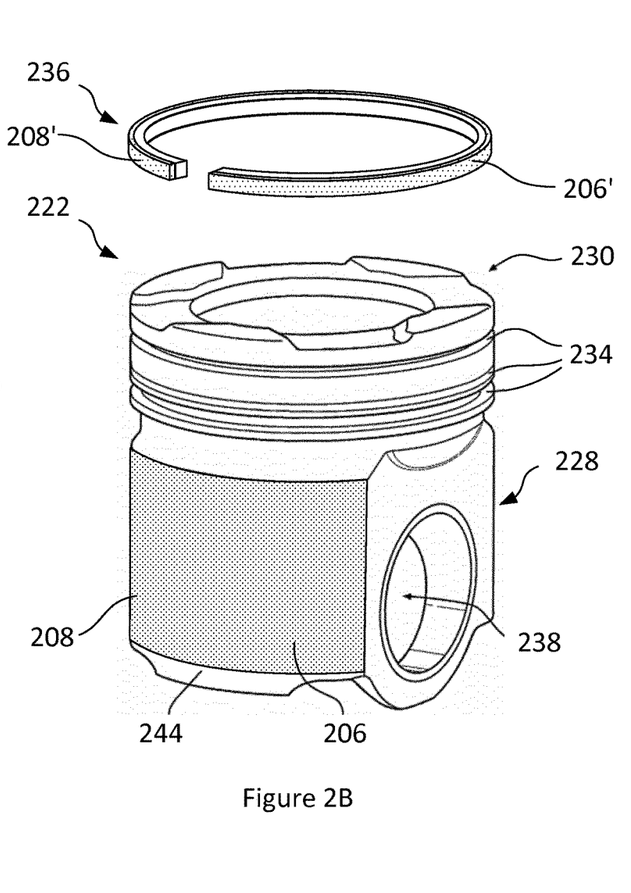
FIG. 2B shows a perspective view of the piston of FIG. 2A.

The present invention also relates to piston assembly components, e.g. piston rings, piston skirts, or the cylinder wall of the engine block. FIG. 2A illustrates a piston assembly 220 comprising sliding engine components, and FIG. 2B illustrates the corresponding piston 222.

The piston assembly 220 is adapted for reciprocal movement of a piston 222 within a cylinder 224 of an internal combustion engine 226. The piston 222 comprises a body 228 having a crown 230 formed at the uppermost margins of the body 228 and a skirt 232 depending from the crown 230. The piston 222 further includes ring lands 234 extending about the circumference of the body 228 and adapted to retain piston rings 236. A pin bore 238 extends through the lower margins of the body 228 and is adapted to receive a piston pin 240.

The piston skirt 232 includes an outer circumference having a major thrust side 242 and a minor thrust side 244 formed substantially opposite each other on the outer circumference of the skirt. The piston 222, and more particularly the skirt 232, is adapted for relative sliding motion with respect to the wall of a cylinder 246.

A connecting rod 248 is adapted to interconnect the piston 222 and a crankshaft (not shown, but generally known in the art). The connecting rod 248 is fastened to the crankshaft using bolts 250. The connecting rod 248 also includes a bore 252 at the opposite end (which may be lined with a plain bush sliding bearing). A piston pin 240 is operatively received through the alignment pin bore 238 in the piston 222 and the bore 252, extending through the connecting rod 248.

In use, fuel is combusted within the cylinders 224, causing reciprocation of the pistons 222.

The piston 222 drives the connecting rod 248, which drives the crankshaft, causing it to rotate relative to bearings supported by the engine 226. In this way, power may be translated from the piston, via the crankshaft, to drive a vehicle or other device. Specifically, the combustion pressure within the cylinder 224 drives the piston 222 downward in a substantially linear motion. However, in addition to the substantially linear motion of the piston 222, there is some lateral movement due to the gap (i.e. tolerance) between the outer surface of the piston skirt 232 and the interior wall 246 of the cylinder 224.

As a result of lateral movement by the piston 222 within the cylinder 224, the piston skirt 232 presses against the cylinder wall 246 during the powerstroke and return movements. The surface areas of the piston 222 that may contact the cylinder wall 246 during major and minor thrust movements are the major thrust side 242 and the minor thrust side 244. While lubricating oil generally prevents metal-to-metal contact between the piston skirt 232 and the cylinder wall 246, factors such a load, temperature and insufficient lubrication may reduce or eliminate the layer of lubricant and cause scuffing on the surface of the piston skirt 232 and/or the cylinder wall 246. Scuffing in this area can eventually cause the engine 226 to seize or fail.

Accordingly, it is important to keep the major thrust side 242 and the minor thrust side 244 of a piston skirt 232 lubricated. To this end, the piston 222 of the present invention includes a coating 206 provided on the piston skirt 232 so as to be juxtaposed between the skirt 232 and the cylinder 224 to improve lubrication between the piston 222 and a cylinder 224. Although FIGS. 2A and 2B illustrate an arrangement in which the coating 206 on the piston skirt 232 is not patterned, other arrangements of the coating may be provided in which the coating is patterned, e.g. with grooves separating the coating into islands of coating on the skirt.

Similarly, a lubrication coating 206' may be provided on at least the outer circumferential surface of the piston rings 236 (e.g. the coating 206' of the present invention may be provided on the two piston rings closest to the pin bore 238; the piston ring closest to the crown of the piston may have an inorganic ceramic coating). Although not illustrated, the cylinder wall (or cylinder liner, in the case of a lined/sleeved piston cylinder) and bearing surfaces of the connecting rod 248, may also be provided with a coating according to the present invention. These lubrication coatings 206 and 206' are plastics polymer-based composite layers comprising liquid-filled microcapsules 208 and 208', in accordance with the present invention.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A sliding engine component, comprising:
a sliding surface including a plastics polymer-based composite layer disposed on a substrate, the composite layer including:
a matrix of plastics polymer-based material including a polyimide-amide material and having distributed throughout the matrix:
0.1 to 20% volume of liquid-filled microcapsules;
incidental impurities; and
wherein the liquid-filled microcapsules include a shell of a polymeric material resistant to dissolution in a solvent system including at least one of a non-polar solvent and a polar aprotic solvent, wherein the shell of the liquid-filled microcapsules includes at least one of: (i) a functionalised exterior surface having at least one of a surface charge, a hydrophilic surface and a hydrophobic surface, and (ii) a coating providing a metalized exterior surface, and wherein the at least one of the functionalised exterior surface and the coating promotes suspension of the liquid-filled microcapsules within a solution of the composite layer prior to deposition of the composite layer onto the substrate.

2. A sliding engine component according to claim 1, wherein the matrix of plastics polymer-based material includes 0.5 to 5% vol. of liquid-filled microcapsules.

3. A sliding engine component according to claim 1, wherein the liquid-filled microcapsules have a mean average diameter of less than or equal to half of a thickness of the composite layer.

4. A sliding engine component according to claim 1, wherein at least one of the composite layer has a thickness of 6 μm to 40 μm and the liquid-filled microcapsules have a mean average diameter of 0.5 μm to 10 μm.

5. A sliding engine component according to claim 1, wherein the composite layer has an outer surface providing the sliding surface, and wherein at least some of the liquid-filled microcapsules are embedded in the composite layer and exposed at the outer surface.

6. A sliding engine component according to claim 1, wherein the composite layer further includes a plurality of separate sub-layers disposed one on top of the other, and wherein the plurality of sub-layers have different concentration by percent volume of the liquid-filled microcapsules.

7. A sliding engine component according to claim 6, wherein the plurality of sub-layers further include different concentrations by percent volume of a metal particulate.

8. A sliding engine component according to claim 6, wherein the plurality of sub-layers include different types of the liquid-filled microcapsules.

9. A sliding engine component according to claim 1, wherein a liquid of the liquid-filled microcapsules includes a liquid lubricant.

10. A sliding engine component according to claim 9, wherein the liquid of at least some of the liquid-filled microcapsules further includes a liquid additive different from the liquid lubricant.

11. A sliding engine component according to claim 10, wherein the liquid additive includes at least one of a corrosion inhibitor and a seal-healing additive.

12. A sliding engine component according to claim 1, wherein the polymeric material of the shell includes at least one of polyester, polyurea, and polyurethane.

13. A sliding engine component according to claim 1, wherein the composite layer further includes at least one of from 0.5 to 15% volume of a dry lubricant particulate and from 0.5 to less than 15% volume of a metal powder.

14. A sliding engine component according to claim 1, wherein the composite layer further includes from 0.1 to 5% vol. of carbon nanostructures.

15. A sliding engine component according to claim 1, wherein the matrix of plastics polymer-based material further includes a distribution of the following:
from 0.5 to less than 15% vol. of a metal powder;
from 0.5 to 15% vol. of a fluoropolymer particulate, the balance being the polyimide polyamide plastics polymer material apart from incidental impurities.

16. A sliding engine component according to claim 1, wherein the composite layer further includes from 0.5 to 10% vol. of an inorganic particulate.

17. A sliding engine component according to claim 1, wherein the substrate includes a metallic backing material layer and the composite layer is disposed on the metallic backing material layer.

18. A sliding engine component according to claim 1, wherein the substrate includes a metallic backing layer and a metallic lining layer and the composite layer is disposed on the metallic lining layer.

19. A sliding engine component according to claim 1, wherein the substrate includes a non-sputter-coated metallic base layer and the composite layer is bonded to the non-sputter-coated metallic base layer via a sputter-coated Al-based intermediate layer.

20. A sliding engine component according to claim 1, wherein the sliding engine component is a sliding bearing assembly component selected from at least one of: a bearing lining shell, a bushing, a bearing surface of a crankshaft, a bearing surface of a camshaft, a bearing surface of a connecting rod, a thrust washer, a bearing surface of a bearing block, and a bearing surface of a bearing cap.

21. A sliding engine component according to claim 1, wherein the sliding engine component is a piston assembly component selected from at least one of a piston ring, a piston skirt, and a cylinder wall.

22. A sliding engine component according to claim 9, wherein the liquid lubricant has a viscosity of ≥5.6 cSt.

23. A method of manufacturing a sliding engine component, comprising:
   providing a solvent, wherein the solvent includes at least one of a non-polar solvent and a polar aprotic solvent;
   adding a plastics polymer-based resin material and liquid-filled microcapsules to the solvent and intermixing the plastics polymer-based resin material and liquid-filled microcapsules to provide a solvent mixture, wherein the liquid-filled microcapsules include a shell of a polymeric material resistant to dissolution in the solvent;
   coating the solvent mixture onto a substrate to provide a plastics polymer-based composite layer on the substrate composed of a plastics polymer-based material matrix including from 0.1 to 20 percent volume of the liquid-filled microcapsules and incidental impurities distributed throughout the plastics polymer-based material matrix; and
   treating the solvent mixture so as to remove the solvent and consolidate the plastics polymer-based material matrix.

24. A method according to claim 23, wherein the plastics polymer-based resin material includes a polyimide-amide resin and the solvent includes at least one of n-ethyl-2-pyrrolidone, n-methyl-2-pyrrolidone, and xylene; and
   further including maintaining the liquid-filled microcapsules in suspension within the solvent mixture prior to coating the solvent mixture onto the substrate.

25. A method according to claim 23, wherein coating the solvent mixture onto the substrate to provide the plastics polymer-based composite layer includes depositing at least two sub-layers overlaying the substrate one on top of the other and providing the at least two sub-layers with different concentrations by percent volume of the liquid-filled microcapsules.

26. A method according to claim 23, further comprising providing the shell of the liquid-filled microcapsules with a functionalised exterior surface to promote suspension of the liquid-filled microcapsules in the solvent mixture prior to coating the solvent mixture onto the substrate, the functionalised exterior surface including an anionic or cationic surface charge common to all of the liquid-filled microcapsules.

27. A sliding engine component according to claim 26, wherein the second sub-layer includes a higher concentration of the liquid-filled microcapsules by percent volume than the first sub-layer, and wherein the liquid-filled microcapsules of the second sub-layer include a first type of microcapsules filled with a liquid lubricant and a second type of microcapsules filled with a liquid lubricant and an additive.

28. A sliding engine component according to claim 26, wherein the plastic polymer-based material matrix further includes a metal particulate distributed throughout the first sub-layer and the second sub-layer; and
   wherein the second sub-layer has a lower concentration by percent volume of the liquid-filled microcapsules than the first sub-layer, and the second sub-layer has a higher concentration by percent volume of the metal particulate than the first sub-layer.

29. A sliding engine component, comprising:
   a plastics polymer-based composite layer disposed on a metallic substrate, the plastics polymer-based composite layer composed of a plastics polymer-based material matrix including from 0.1 to 20% volume of liquid-filled microcapsules distributed throughout the plastics polymer-based material matrix and incidental impurities;
   wherein the plastics polymer-based composite layer includes a first sub-layer and a second sub-layer overlaying the metallic substrate one on top of the other, the second sub-layer disposed between the metallic substrate and the first sub-layer; and
   wherein the liquid-filled microcapsules are embedded throughout the first sub-layer and the second sub-layer of the plastics polymer-based composite layer, and the first sub-layer has a different concentration by percent volume of the liquid-filled microcapsules than the second sub-layer.

* * * * *